(12) United States Patent
Sakai et al.

(10) Patent No.: US 7,350,710 B2
(45) Date of Patent: Apr. 1, 2008

(54) TWO-DIMENSIONAL CODE EXTRACTING METHOD

(75) Inventors: Kenichiro Sakai, Sagamihara (JP); Tsugio Noda, Hatano (JP)

(73) Assignee: Fujitsu Limited, Kawasaki (JP)

( * ) Notice: Subject to any disclaimer, the term of this patent is extended or adjusted under 35 U.S.C. 154(b) by 4 days.

(21) Appl. No.: 09/835,625

(22) Filed: Apr. 17, 2001

(65) Prior Publication Data

US 2002/0051573 A1 May 2, 2002

(30) Foreign Application Priority Data

Apr. 18, 2000 (JP) ............................. 2000-116429

(51) Int. Cl.
*G06K 7/10* (2006.01)
(52) U.S. Cl. ................. 235/462.09; 235/462.1
(58) Field of Classification Search ........................ 235/462.01–462.49; 382/181, 190, 194
See application file for complete search history.

(56) References Cited

U.S. PATENT DOCUMENTS

| 5,296,690 | A | * | 3/1994 | Chandler et al. | ......... 235/462.1 |
| 5,557,091 | A | * | 9/1996 | Krummel | ............... 235/462.08 |
| 5,591,952 | A | * | 1/1997 | Krichever et al. | ..... 235/462.11 |
| 6,325,287 | B1 | * | 12/2001 | Nakajima et al. | ......... 235/462.1 |
| 6,650,776 | B2 | * | 11/2003 | Ihara et al. | .................. 382/181 |
| 7,050,631 | B2 | * | 5/2006 | Bian et al. | ................... 382/183 |

\* cited by examiner

*Primary Examiner*—Jamara A. Franklin
(74) *Attorney, Agent, or Firm*—Staas & Halsey LLP

(57) ABSTRACT

An image data is inputted by using a device such as a document scanner. The input image data is scanned in a square block unit of M×N pixels, and blocks that satisfy specific conditions is detected based on the scanning process. In one example, a ratio of white pixels and black pixels falls within scanned blocks is used as the specific condition to detect those blocks. Then a region that neighbored by the other blocks is detected, and is extracted as a two-dimensional code region.

20 Claims, 18 Drawing Sheets

FIG. 4

| BLOCK NUMBER | X COORDINATES | Y COORDINATES | CONNECTED BLOCK COUNT | REGION NUMBER |
|---|---|---|---|---|
| 1 | X1 | Y1 | C1 | R1 |
| 2 | X2 | Y2 | C2 | R2 |
| ... | ... | ... | ... | ... |
| i | Xi | Yi | Ci | Ri |
| ... | ... | ... | ... | ... |
| n | Xn | Yn | Cn | Rn |
| EOB | - | - | - | - |

EOB: END OF BLOCK TABLE,
IDENTIFIERS SHOWING THE END OF THE TABLE

| BLOCK NUMBER | X COORDINATES | Y COORDINATES | CONNECTED BLOCK COUNT | REGION NUMBER |
|---|---|---|---|---|
| 1 | 352 | 64 | 3 | 1 |
| 2 | 384 | 64 | 3 | 1 |
| 3 | 192 | 96 | 2 | 2 |
| 4 | 224 | 96 | 2 | 2 |
| 5 | 384 | 96 | 3 | 1 |
| 6 | 192 | 352 | 20 | 3 |
| 7 | 224 | 352 | 20 | 3 |
| 8 | 256 | 352 | 20 | 3 |
| 9 | 288 | 352 | 20 | 3 |
| 10 | 320 | 352 | 20 | 3 |
| 11 | 352 | 352 | 20 | 3 |
| 12 | 32 | 384 | 1 | 4 |
| 13 | 192 | 384 | 20 | 3 |
| ... | ... | ... | ... | ... |
| 26 | 352 | 448 | 20 | 3 |
| EOB | - | - | - | - |

210

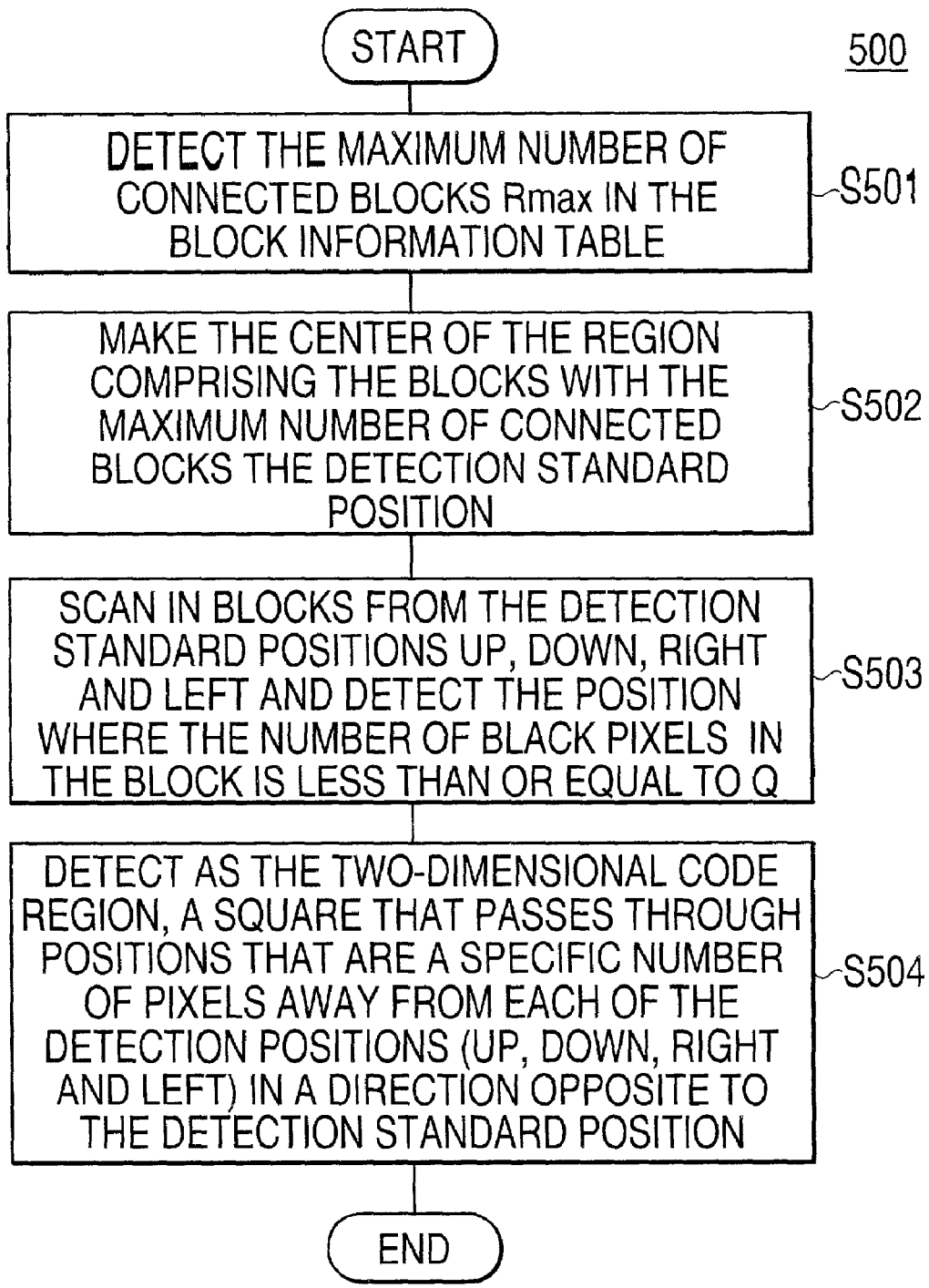

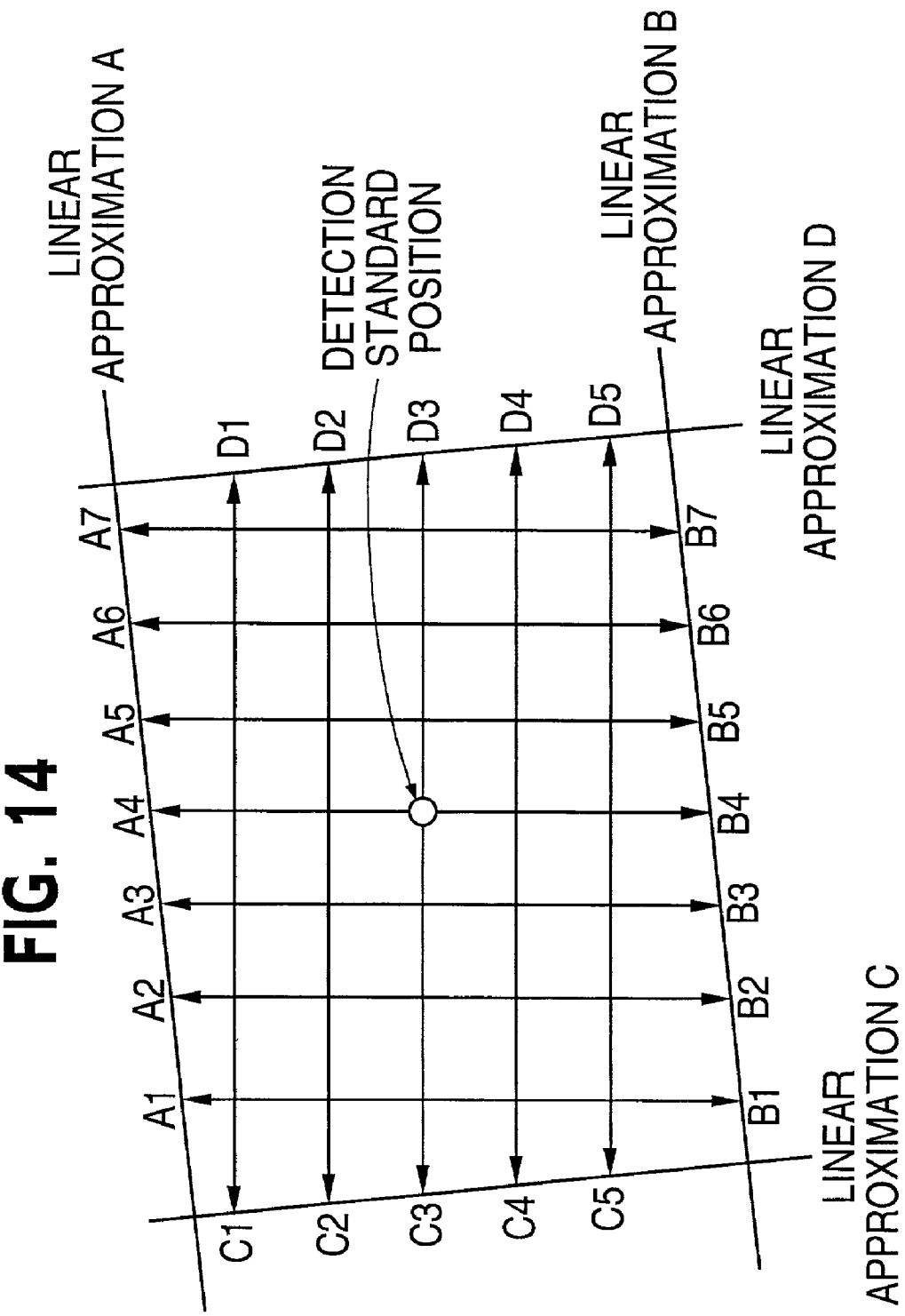

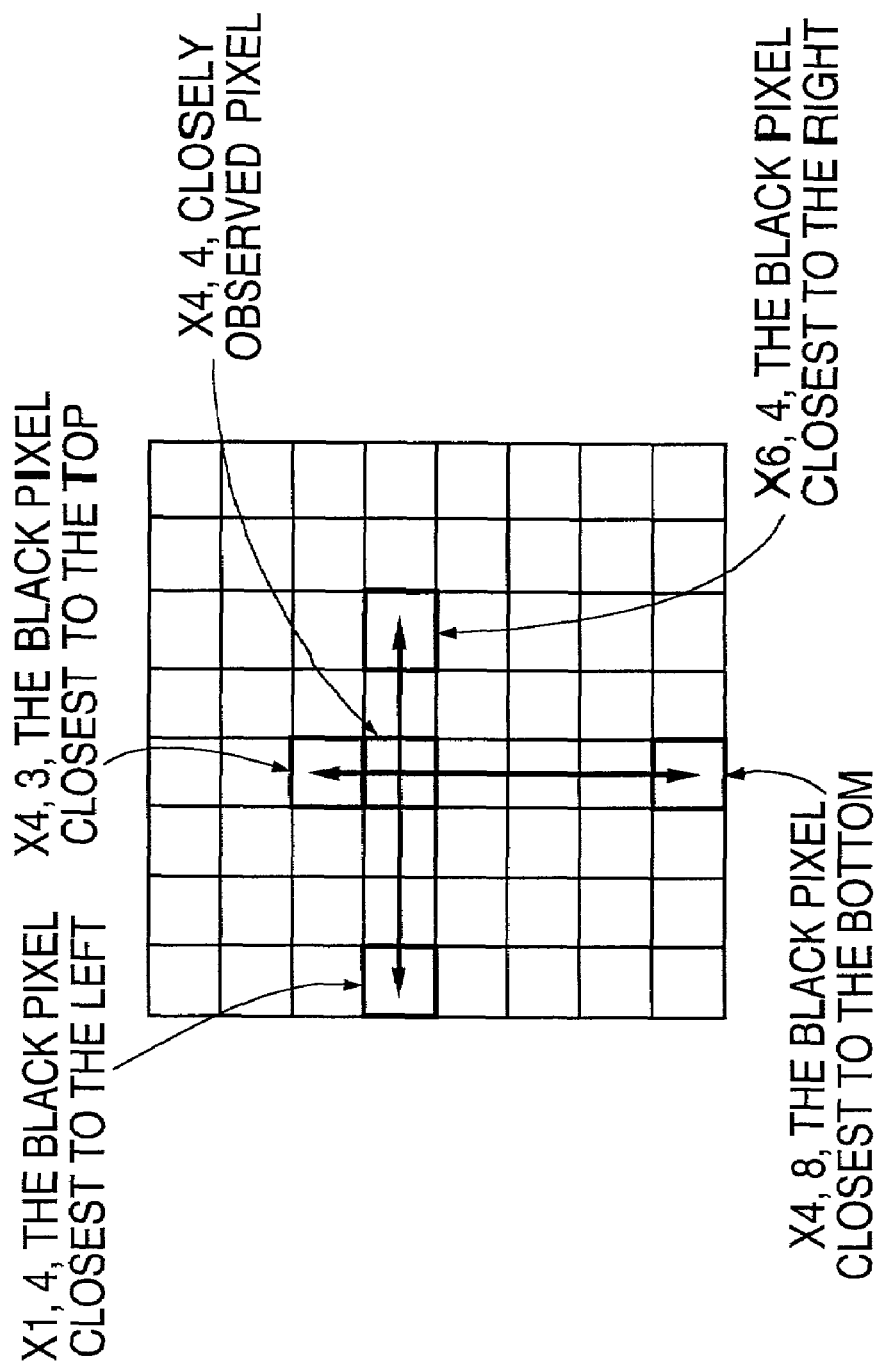

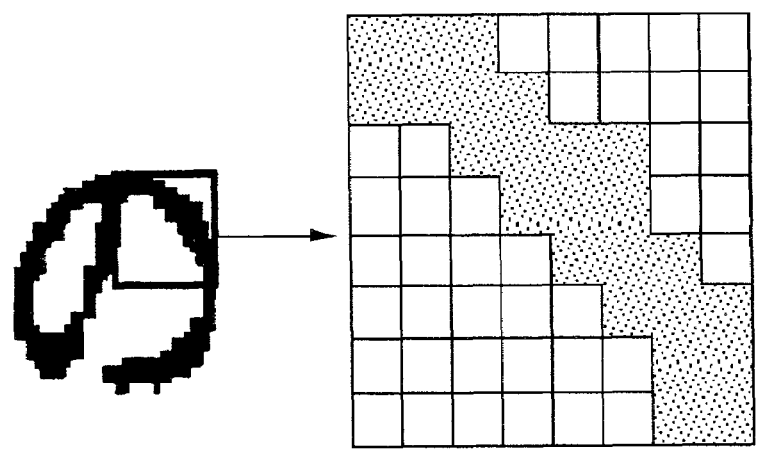
FIG. 16(A) BLACK PIXEL DISTRIBUTION WITHIN TEXT BLOCK
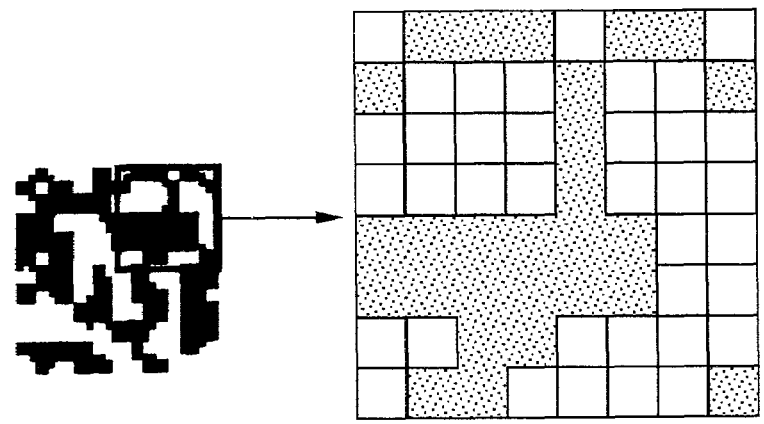
FIG. 16(B) BLACK PIXEL DISTRIBUTION WITHIN TWO-DIMENSIONAL CODE BLOCK

FIG. 17(A)

| 2 | 3 | 2 |   |   |   |   |   |
|---|---|---|---|---|---|---|---|
| 2 | 2 | 4 | 2 |   |   |   |   |
|   |   | 2 | 4 | 3 | 2 |   |   |
|   |   |   | 2 | 4 | 3 |   |   |
|   |   |   |   | 2 | 4 | 2 |   |
|   |   |   |   |   | 2 | 4 | 2 |
|   |   |   |   |   |   | 3 | 3 |
|   |   |   |   |   |   | 2 | 2 |

DAVG = 63/24 = 2.6

AVERAGE BLACK PIXEL INTERVAL IN A TEXT BLOCK

FIG. 17(B)

|   | 5 | 6 | 6 |   | 6 | 1 |   |
|---|---|---|---|---|---|---|---|
| 8 |   |   |   | 8 |   |   | 9 |
|   |   |   |   | 2 |   |   |   |
|   |   |   |   | 2 |   |   |   |
| 5 | 6 | 6 | 6 | 4 | 6 |   |   |
| 1 | 5 | 4 | 4 | 3 | 2 |   |   |
|   |   | 3 | 2 |   |   |   |   |
|   | 3 | 7 |   |   |   |   | 11 |

DAVG = 131/27 = 4.9

AVERAGE BLACK PIXEL INTERVAL IN A
TWO-DIMENSIONAL CODE BLOCK

TWO-DIMENSIONAL CODE EXTRACTING METHOD

BACKGROUND OF THE INVENTION

1. Field of the invention

The present invention relates to a two-dimensional code extraction method for automatically extracting two-dimensional code images from an image data read into an apparatus such as a computer, using a scanner or other image input device, from sheets upon which the two-dimensional code has been printed on documents or tables.

2. Description of the Related Art

In recent years, the development of two-dimensional code, which can hold more information than conventional bar codes, has progressed and begun to be used in practical applications. The use of two-dimensional code makes it possible to print all manner of binary data, including documents, imaging and audio data, on paper surfaces.

Documents imprinted with two-dimensional code can be transmitted via facsimile or distributed as printed matter. The receiving party can then read in the two-dimensional code as image data by using an image scanner, and restore data to its original state by using software and hardware designed for restoring two-dimensional code.

Among two-dimensional codes are those that can be read using a general type of image scanner. This allows the data to be restored by reading it into a nearby scanner without using a specialized device, giving it the advantage of being read by a wide range of reading devices.

However, if a two-dimensional code is printed on paper not by itself, but alongside documents (text etc.) and diagrams in the desired size and position, it is highly likely that a portion of the accompanying text, diagram or image data, will be scanned along with the two-dimensional code.

When images other than the two-dimensional codes are included in the scanned data, the software or hardware intended to restore the data to its original state cannot restore the scanned data properly, as the software or hardware can not extract a two-dimensional code portion from the others. Therefore, the two-dimensional code portion has to be extracted separately from the other image data that is scanned in.

SUMMARY OF THE INVENTION

The object of the present invention is to extract two-dimensional codes from a scanned image data.

In the present invention, inputted image data is scanned in a square block unit of M×N pixels, where both M and N are positive integers. Blocks that satisfy specific conditions are detected from the scanned blocks, then a region comprising the neighboring and contiguous blocks among the detected blocks is detected. The detected region is extracted as a two-dimensional code region.

More specifically, a block that a ratio of white pixels and black pixels falls within a specific range is detected as a block satisfies the above-mentioned specific conditions.

More over, a block that a ratio between transition points of pixels within the horizontal lines and/or vertical lines of the block and the total number of pixels of the block falls within a specific range is detected as a block satisfy the above-mentioned specific conditions.

Instead, a block in which a vertical and/or horizontal projection of the black pixels contained in each of the lines in the blocks fall within a specific range is detected a block satisfy the above-mentioned specific conditions.

Further, in the present invention, a region containing specific numbers of blocks is detected from the above-mentioned detected region comprising the neighboring and contiguous blocks, and the determined region is determined as a two-dimensional code region.

Also, in the present invention, the detected two-dimensional code region is scanned from a point within the above-mentioned two-dimensional code region block by block having a predetermined size toward upward, downward, to the right and to the left of the above-mentioned point. Then a position that a number of black pixels within the above-mentioned scanned block is less that a predetermined value is detected, and a square area including the above-mentioned detected position is extracted as a two-dimensional code region.

In addition, in the present invention, an average distance between pairs of black pixels within the above-mentioned scanned blocks is calculated and the scanned block is extracted as a two-dimensional code when it is determined that the above-mentioned calculated average distance exceeds a predetermined value.

Additional objects and advantages of the invention will be set forth in part in the description which follows and, in part, will be obvious from the description, or may be learned by practice of the invention.

BRIEF DESCRIPTION OF DRAWINGS

These and other objects and advantages of the invention will become apparent and more readily appreciated from the following description of the preferred embodiments, taken in conjunction with the accompanying drawings of which:

FIG. 4 is a diagram showing a block information table.

FIG. 8 is a diagram showing an example of a block information table

FIG. 11 is another flowchart showing a process for detecting a two-dimensional code region.

FIG. 14 is a diagram showing an example of an inclined two-dimensional code.

FIG. 15 is a diagram describing a detecting process of a two-dimensional code region.

FIG. 16 (A) is a diagram showing a black pixel distribution of a text block.

FIG. 16 (B) is a diagram showing a black pixel distribution of a two dimensional code block.

FIG. 17(A) is a diagram showing a result of the calculation of the distance between black pixels for the text block shown in FIG. 16(A).

FIG. 17(B) is a diagram showing a result of the calculation of the distance between black pixels for the two-dimensional code block shown in FIG. 16(B).

DESCRIPTION OF THE PREFERED EMBODIMENTS

Figure 1:
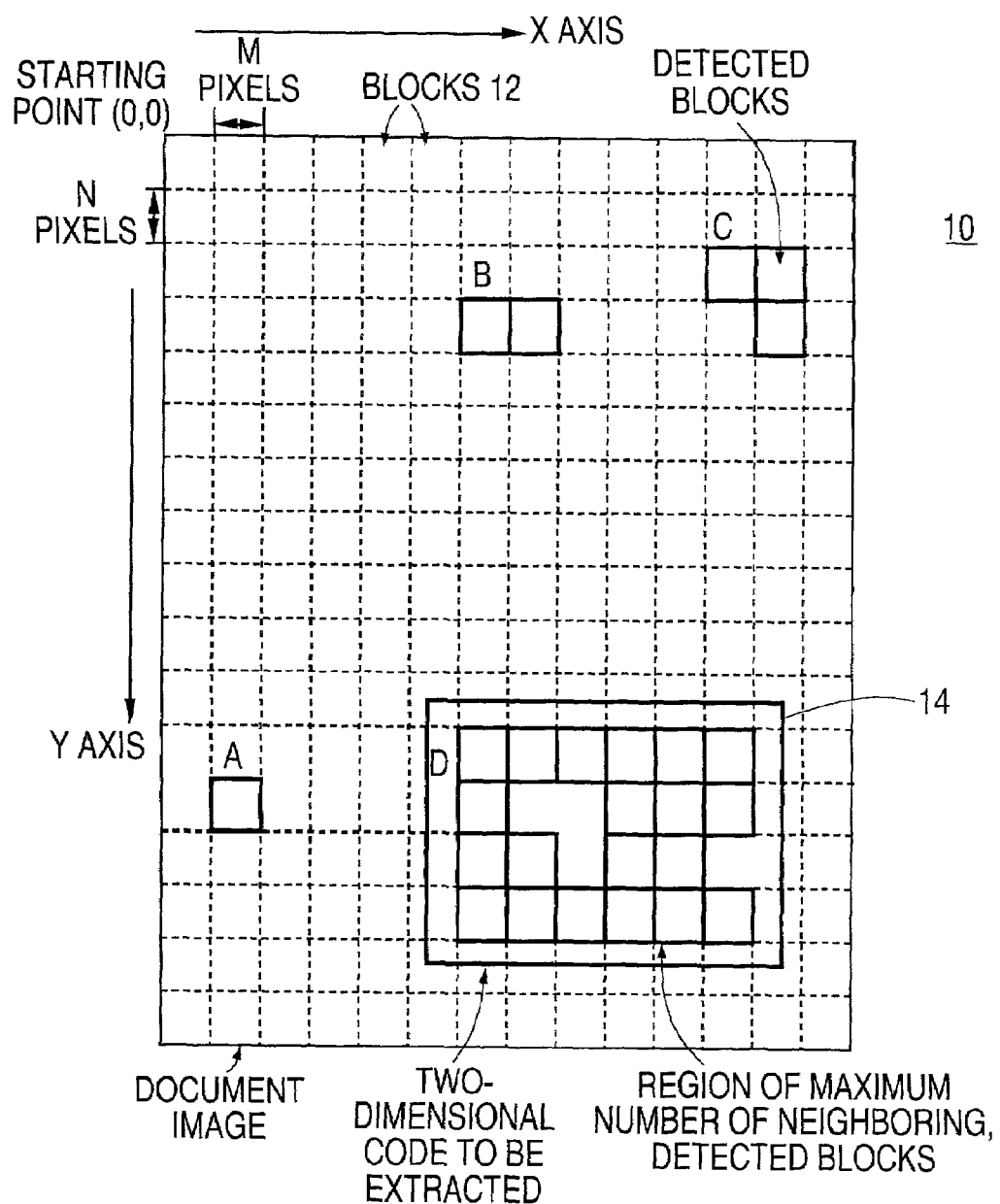
FIG. 1 is a diagram showing a model of a text image read by an image scanner containing text and diagram regions and two-dimensional code regions.

The following are descriptions of the embodiments of the present invention with reference to diagrams, wherein like reference numerals refer to the like elements throughout. The embodiments are described below in order to explain the present invention by referring to the figures.

Generally, a two-dimensional code is a code comprises [that] binary data that is converted into a pixel pattern by using a specific algorithm. Unlike documents or diagrams, the two-dimensional code contains no visible or human-readable information as an image. At the same time, viewed at the level of an image, a pixel pattern of the two-dimensional code has different characteristics than pixel patterns of documents or diagrams. These differences are clearly visible and the two-dimensional code can be easily distinguished visibly in a document or diagram.

FIG. 1 shows an example of an image of a document 10 that is read by an image scanner (not shown in FIG. 1). The document 10 shown in FIG. 1 includes two-dimensional code regions (region D in FIG. 1) and text and diagrams regions. In the example shown in FIG. 1, the image was scanned in blocks 12 comprising horizontal M pixels and vertical N pixels (both M and N are positive integers and they may be equal to one another). The blocks 12 in the scanned image are shown as squares comprising dotted lines. The squares comprising solid lines (such as the squares included in region D), as will be explained in detail later, are the blocks 12 that are extracted as a two-dimensional region (region D), which is determined to comprise a two-dimensional code. Note that in FIG. 1, a two-dimensional code is within a region D located to the lower right of the document 10. To avoid complexity, diagrams or elements other than the detected blocks are not shown in FIG. 1.

In the following explanation, pixels comprising text, diagrams and the two-dimensional code are considered "black pixels," while the background pixels are considered "white pixels."

In the present embodiment, the locations in which the text, diagrams and two-dimensional code differ from one another are examined closely. First, the image is scanned in blocks 12 depending upon whether or not the block 12 is a two-dimensional code region (such as region D), or believed to be a block 12 comprising a two-dimensional code. Those sections with a high proportion of two-dimensional codes are searched for.

A black pixel distribution is calculated in order to determine whether a part of a block 12 includes two-dimensional code. To make this determination, the difference of the black pixel distribution between the two-dimensional code region and the text-region is used.

(1) Distinguishing a Block using the Black Pixel Ratio

This method uses the fact that the black pixel ratio of the two-dimensional code is essentially fixed when taken in block units. In this case, the range of the black pixel ratio of a block judged to include a two-dimensional code is determined in advance, taking noise and scanner characteristics into consideration. This range of the black pixel ratio could be determined in advance based on a result of scanning a particular two-dimensional code. If the black pixel ratio of the scanned block is within the predetermined range of the black pixel ratio, that block will be judged as a block that is a part of the two-dimensional code. On the other hand, a black pixel ratio of a block that is not a part of the two-dimensional code is not within the predetermined range. Therefore, by using the above method, most non-two-dimensional code blocks can be excluded from the scanned image data.

(2) Distinguishing a Block using the Ratio of Transition Points between White and Black Pixels This method utilizes the fact that two-dimensional code pixel change patterns are essentially the same when viewed in block units. Each block 12 is scanned by in units of single horizontal or vertical lines. Then pixel transition points, that is the number of times a black pixel changes to a white pixel or vice versa, of each scanned line is calculated. The total number of the pixel transition points for all of the lines in a block 12 is then divided by a total number of pixels within the block 12, giving a "transition ratio".

A transition ratio of a two-dimensional code block is determined in advance, and the range of transition points for judging a section to be a two-dimensional code is determined, taking variation due to noise appearing when scanning the document or scanner characteristics into consideration.

As long as the transition ratio of a scanned block is within this range, the block is judged to be comprising the two-dimensional code. Using this method, most blocks 12 not containing the two-dimensional code can be excluded.

(3) Distinguishing Blocks using Contiguous Black Pixels within a Block

A distribution of black pixels of a two-dimensional code is essentially uniform. In contrast, black pixels of a block containing text appear in individualized clusters. Therefore, a two-dimensional code block and a block containing text can be distinguished from each other by determining a distribution of black pixels.

This method is used in the two-dimensional code detection of the image characteristics described above.

(4) Distinguishing Blocks from Variations in the Projection of the Black Pixels in the Block In the same manner as the transition points described herein above, the pixel distribution within the two-dimensional code is essentially uniform. In this method, a block is scanned in single horizontal or vertical line units, and a number of black pixels included in each line are counted, which yields the projection of the block. Because the pixel distribution of a two-dimensional code block is nearly uniform, variation of the projection among the scanned lines is small. On the other hand, with text or diagrams, the black pixel distribution is not uniform, so a variation of the projection among the scanned lines is greater than that of the two-dimensional code.

Therefore, if the range of the projection variation for determining the two-dimensional code is decided in advance, and a projection variation of the scanned block falls within that range, the block is considered to be a two-dimensional code block. This allows most blocks that are not two-dimensional code blocks to be excluded.

Combining two or more of the methods described (1) through (4) above will make significant improvements in the detection precision of two-dimensional code blocks.

Even if blocks comprising a two-dimensional code are detected using the black pixel distribution described above, it is possible that a block that is not of a two-dimensional code is included among the blocks that were detected as comprising the two-dimensional code. This is due to the fact that even though a particular block may not include a two-dimensional code, it still satisfies the aforementioned black pixel distribution conditions when viewed in block units.

However, these blocks do not include a two-dimensional code, and it is conceivable that the blocks around these mistakenly detected blocks do not satisfy the conditions for detection as a two-dimensional code as mentioned above. For that reason, the blocks mistakenly detected as the two-dimensional code, but which are not the part of two-dimensional code in fact, exist independently of the other blocks (such as A in FIG. 1) or include just a few neighboring blocks that will be detected (such as B and C in FIG. 1).

On the other hand, a relatively higher number of blocks to be detected as two-dimensional code within a two-dimensional code region compared to outside the two-dimensional code region, as shown in region D of FIG. 1. For this reason, most of the detected blocks that comprise the two-dimensional code within a two-dimensional region are neighboring and contiguous, as shown in FIG. 1.

To extract a true two-dimensional code region, a region having the greatest number of neighboring and contiguous blocks that are determined as a two-dimensional code region is detected. Then, the detected region is enclosed by a square area having a specific margin.

By making such a specific margin as a width of the largest block, a region containing the entire two-dimensional code can always be detected.

In addition, the document may contain several two-dimensional codes. To perform an extraction of such a two-dimensional code region, it is desirable to select regions containing contiguous blocks more than a specific, predetermined number.

Furthermore, the following methods of an embodiment of the present invention allow more precise detection of two-dimensional code regions.

Figure 2:
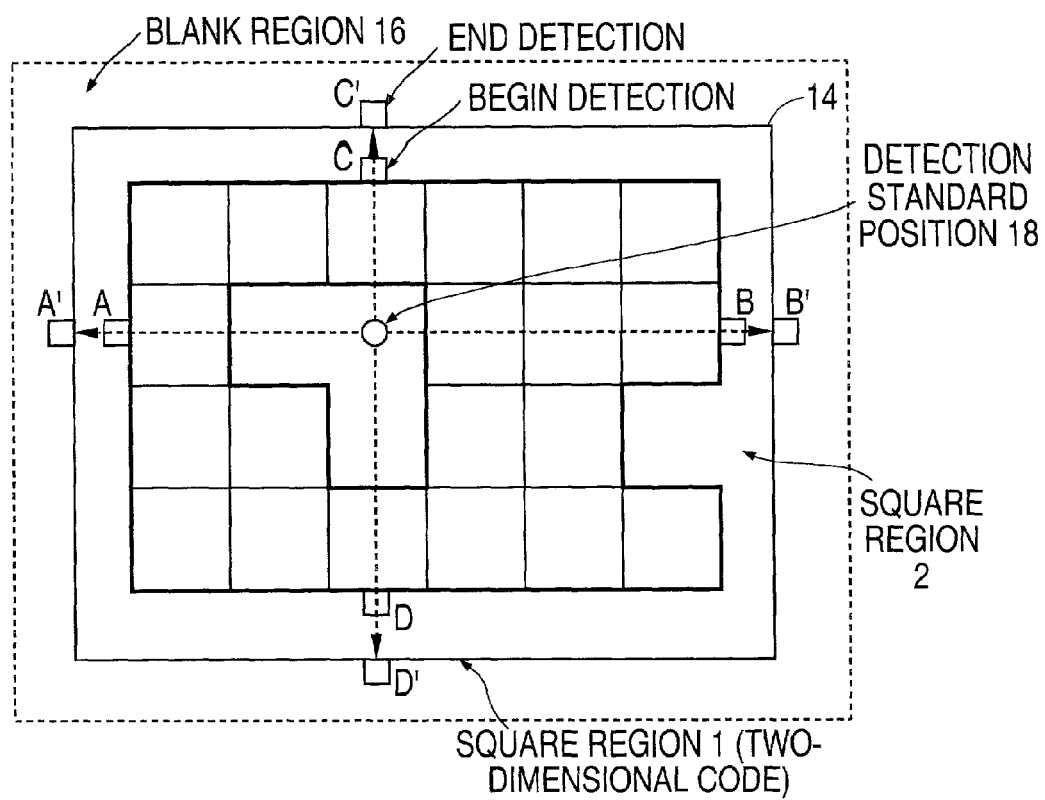
FIG. 2 is an enlarged diagram of a two-dimensional code region shown in FIG. 1

FIG. 2 shows an enlargement of the portion 14 of the document 10 shown in FIG. 1. More particularly, FIG. 2 shows a region having the largest number of neighboring blocks that was detected as a two-dimensional code using the aforementioned methods. In FIG. 2, a region 14 inside of the outermost square indicated by a solid line is a two-dimensional code region to be detected (called "square region 1" hereafter). Further, a square region inside of the square region 1, indicated by bold lines in FIG. 2, is a region that border the blocks that were detected as two-dimensional code by using the methods as described above (called "square region 2" hereafter). In addition, a region between the outermost square indicated by a clotted line and the square region 1 is a blank region 16 that is established to separate the two-dimensional code from the text or diagrams regions. Pixels within the blank region are typically all white.

To extract the two-dimensional code region, a standard position 18 is set within square region 2. In FIG. 2, the standard position 18 is shown by a circle. The example of FIG. 2 has one standard position 18 located at the center of the detected region (the center of a particular block closest to the center of the detected area). With this standard position as the center, a detection process of the border of the two-dimensional code is carried out by scanning the image data from the standard position to the left and to the right as well as to the top and to the bottom of the detected region. In this way, scanning proceeds from the standard position toward the outer edge of the two-dimensional code, block by block. Generally, a blank region of a specific margin is arranged around a two-dimensional code. When a block within which all of the pixels are white is scanned, it means that the blank region will have been reached. The side of the detected block of white pixels proximate to the standard position is a border of a two-dimensional code.

Here, an area inside of the square region 2 is considered to be a two-dimensional code region. Therefore, the detection process, or scanning, of the two-dimensional code border may be started from blocks just outside of the square region 2, as shown in A to D of FIG. 2. In FIG. 2, such blocks are shown in smaller squares. The scanning of the blocks is done block by block from blocks A to D toward the border of two-dimensional code region, the square region 1. By doing so, blocks within which all of the pixels are white is detected. Such blocks are shown as A' to D' in FIG. 2, respectively. As with blocks A to D, blocks A' to D' are shown in smaller squares. Then, the square region which is adjacent to the side of blocks A' to D' proximate to the standard position, that is the side of the blocks closer to two-dimensional code, will be detected as a two-dimensional code square region, which is the square region 1.

When extracting the two-dimensional code region, the image of the two-dimensional code can be restored properly by placing a margin of white pixels of a specific width around the two-dimensional code, which is needed for the software executed by the hardware to restore the two-dimensional code to its original state.

When reading the two-dimensional code from a paper surface by using a hand-held image scanner, the scanner is operated manually. It is thus conceivable that the scanner can move at an angle, thus causing the scanned image to be inclined.

In the present invention, the inclination of the two-dimensional code is detected at the same time as the two-dimensional code is extracted. The angle of inclination of the two-dimensional code is then corrected as it is extracted, so that an inclination-free two-dimensional code can be extracted.

If the two-dimensional code is square, then the upper and lower sides of the two-dimensional code region, that is a border of the two-dimensional region, are parallel to each other. Therefore, a detecting process of the inclination will proceed by detecting several points on the upper and lower sides of the two-dimensional code region. The inclination of the borderline can be calculated by using a liner approximation of the coordinates within the image data. By doing so, the inclination angle of the two-dimensional code region is determined. The left and right sides of the two-dimensional code region are also parallel to each other, so the angle of inclination can be determined in the same way by detecting several points on the left and right sides of the two-dimensional code region. Thus, precision of detecting the two-dimensional code region is improved by detecting the inclination of the region from above and from below, as well as to the right and to the left.

When reading the document by using a manually operated hand-held scanner, the hand-held scanner can be scanned in any direction from up, down, left or right. For this reason, the scanned image data can be flipped or rotated as it is input. Before starting the two-dimensional code detection process, the scanned direction can be detected and then the scanned image data is corrected to a proper direction before extraction, allowing the two-dimensional code to be extracted with a consistently correct inclination.

Figure 3:
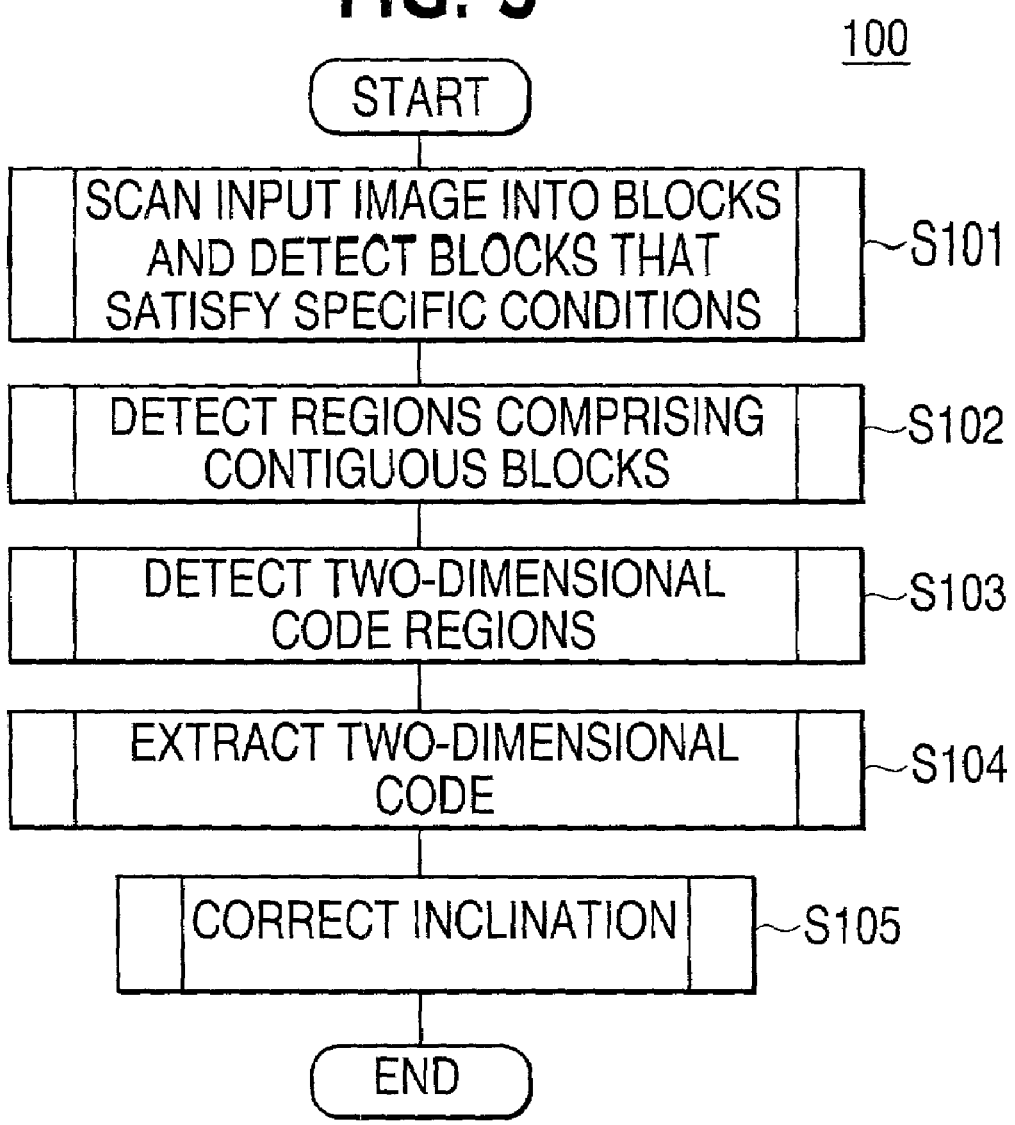
FIG. 3 is a flowchart showing a process for detecting a two-dimensional code region of the present invention.

The following is a detailed description of the embodiments of the present invention based on the diagrams. FIG. 3 is a flow chart 100 showing an overall process of the present embodiment of the present invention. First, the input image is scanned block by block. Using the aforementioned methods (1)~(4), blocks satisfying specific conditions are detected (S101). Next, regions that the detected blocks are connected to each other are detected (S102). The two-dimensional code regions are then detected from the regions detected in S102 (S103), after which the two-dimensional code image is extracted from the two-dimensional code region (S104). Finally, the angle of inclination of the two-dimensional code is detected and, if necessary, the inclination of the scanned image is corrected (S105).

FIG. 4 shows a configuration of a block information table 110 for storing block information that was detected from the scanned images. Block numbers are serial numbers that are added to the block in the order that they were detected as a part of the two-dimensional code. An EOB (End of Block table) code is stored at the end of the block information table for detecting the end of the detected block.

Region serial numbers comprise the X coordinate and Y coordinate of the upper left corner of the scanned block. The number of blocks to be connected is stored in each of the blocks that are detected. The values for each of the block information table categories of the "i" block that is detected would be Xi for the X coordinate, Yi for the Y coordinate, Ci for the number of connected blocks and Ri for the region number.

In the following embodiments, the two-dimensional code detection is performed using this block information table.

Figure 5:
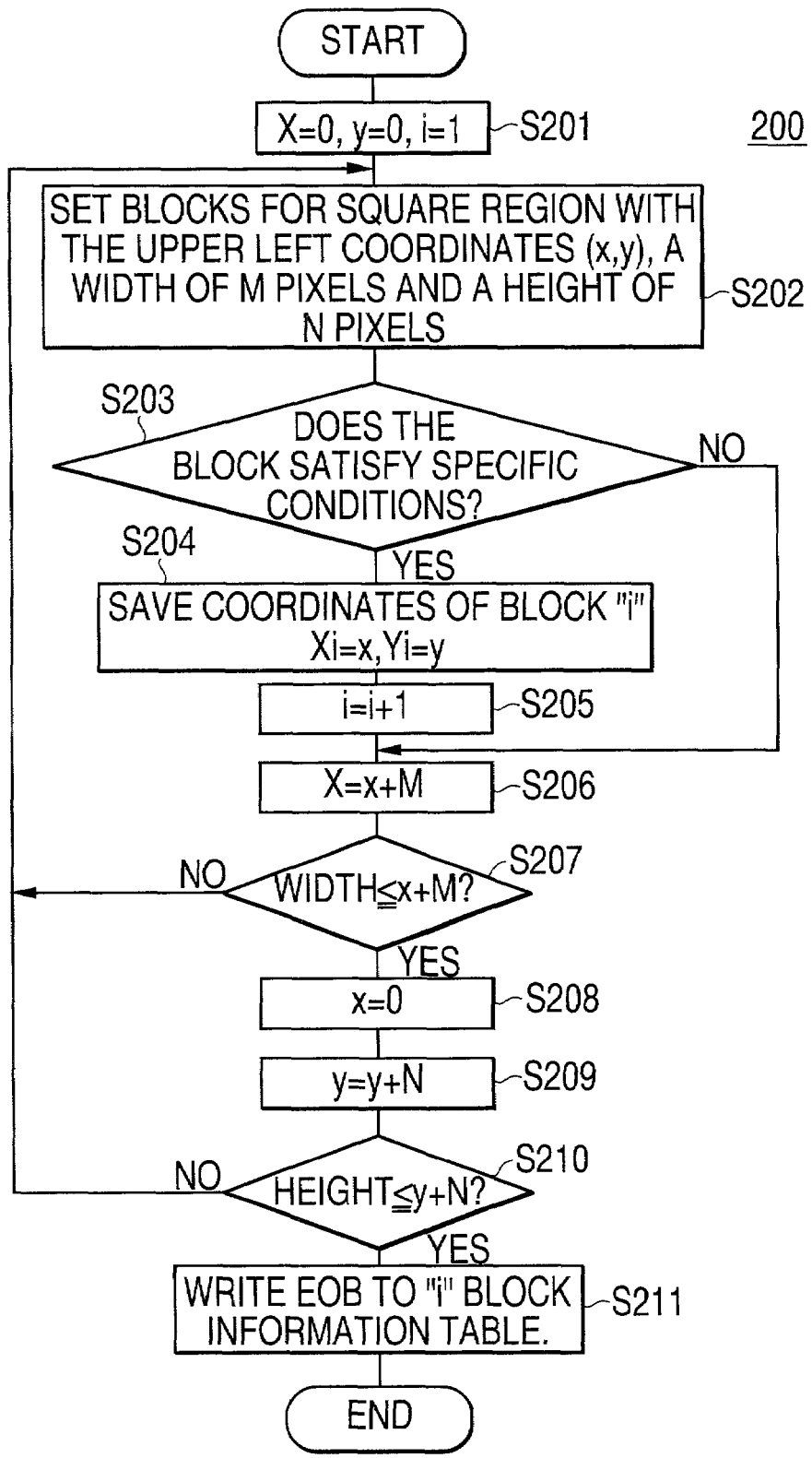
FIG. 5 is a flowchart showing a process for detecting a two-dimensional code block.

FIG. 5 is a process flow diagram 200 showing a two-dimensional code block detection process of the present invention. The process flow diagram 200 shown in FIG. 5 corresponds to the process S101 shown in FIG. 3. The symbols in the diagram 200 indicate the following: X and Y indicate the coordinates of the upper left corner of the scanned block, while M and N indicate the number of horizontal pixels and vertical pixels of the scanned block, respectively. WIDTH and HEIGHT indicate the number of horizontal and vertical pixels of the respective input image. Further, "i" is a variable indicating the number of the detected (or scanned) block, similar to FIG. 4.

In FIG. 5, x=0 and y=0 are the initial settings. That is, the starting point to the upper right corner of the input image is set as the coordinate to the upper left corner of the block. At the same time, "i," which indicates the beginning of the block, is set to 1 (S201).

In S202, the coordinates to the upper left of the scanned block (x, y), are set for a square region that is M pixels wide and N pixels high. Specific conditions of the block, that is, the black pixel ratio, the transition points, and the contiguous state of the black pixels, are examined to determine whether the specific conditions correspond to specific values (S203) satisfying the specific conditions. If, in S203, it is judged that the block in question does not satisfy the specific conditions, the process proceeds to S206. If it is judged that the specific conditions are satisfied in S203, the process continues to S204.

In S204, the "i" category in the block information table is selected, and x is stored in Xi and y is stored in Yi. Then, "1" is appended to block number "i," indicating the next detected block (S205).

In S206, "M" is added to x so that the next coordinate to the upper left corner of the block to be scanned shifts "M" pixels in the axial direction. In S207, it is checked to see whether or not "x+M" is greater than "WIDTH". That is, it checks whether the right edge of the block having a width of M pixels, with x as its X coordinate to the upper left, exceeds the width of the input image. If x+M is less than "WIDTH", the process returns to S202. If x+M exceeds "WIDTH", then x is set to 0 in S208. That is, the X coordinate of the scanned block is set to the left edge of the input image.

In S209, N is added to y and the upper left coordinate of the block to be scanned next is shifted N pixels in the direction of the Y-axis. In S210, it is checked to see whether "x+Y" is greater than "HEIGHT". That is, it checks whether or not the lower edge of the block having a height of N pixels, with y as its Y coordinate to the upper left, exceeds the height of the input image. If y+N is greater than "HEIGHT", the process shifts to S211. In S211, the process ends after the "i" block number from the block information table has been stored in the EOB.

If y+N is less than "HEIGHT" in S210, the process will return to S202.

Figure 7:
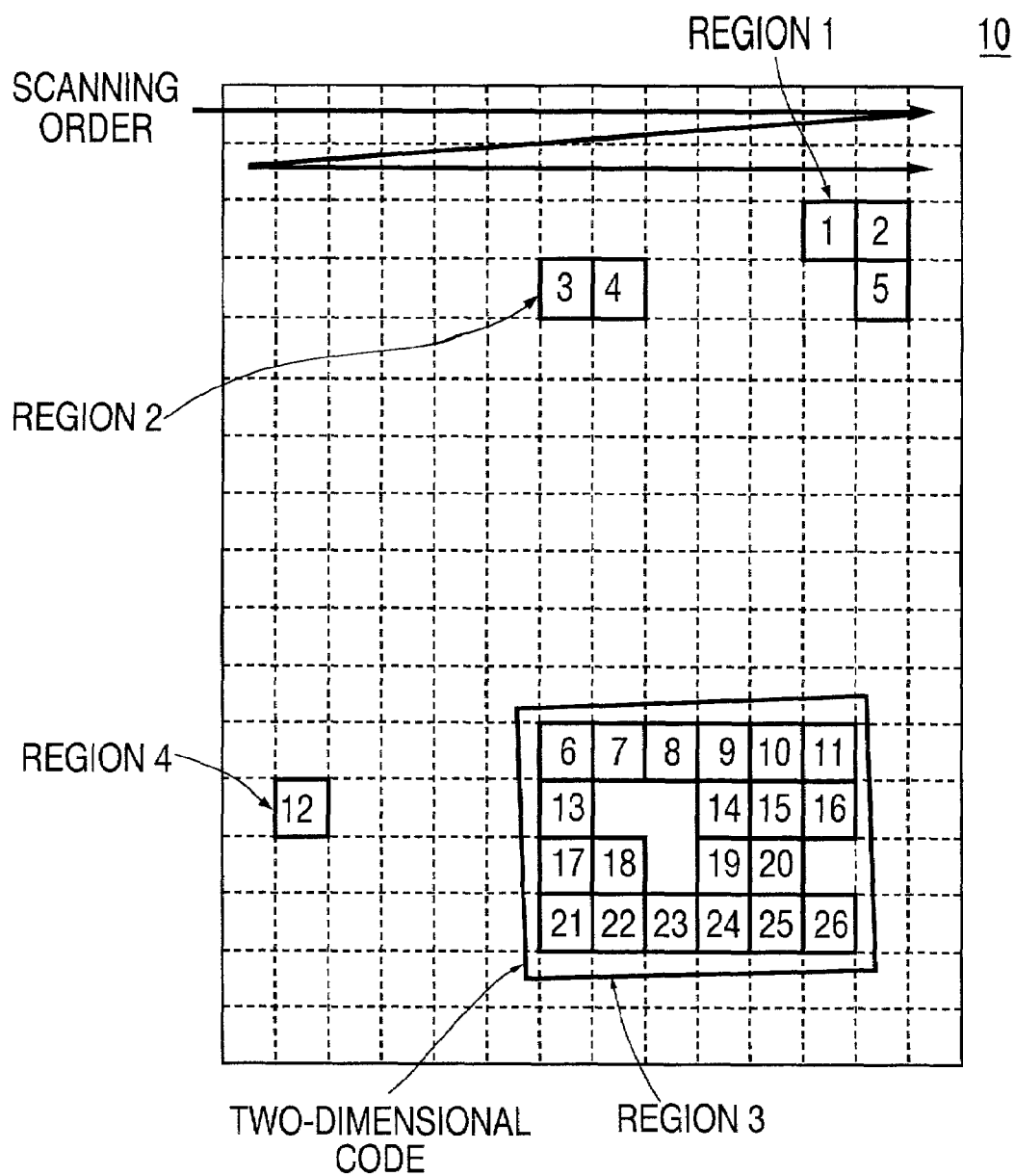
FIG. 7 is a diagram describing two-dimensional code extraction.

By repeating the steps S202 through S210, the entire image is scanned in blocks and, as in the blocks 1~26 shown with heavy lines in FIG. 7, the blocks are detected separately from the two-dimensional code. The X coordinate and the Y coordinate of each of those blocks will be detected, as shown in 1~26 in the block information table 210 shown in FIG. 8. Note that the width M of the block in the example in FIG. 7 is 32 pixels and the height is 32 pixels.

Figure 6:
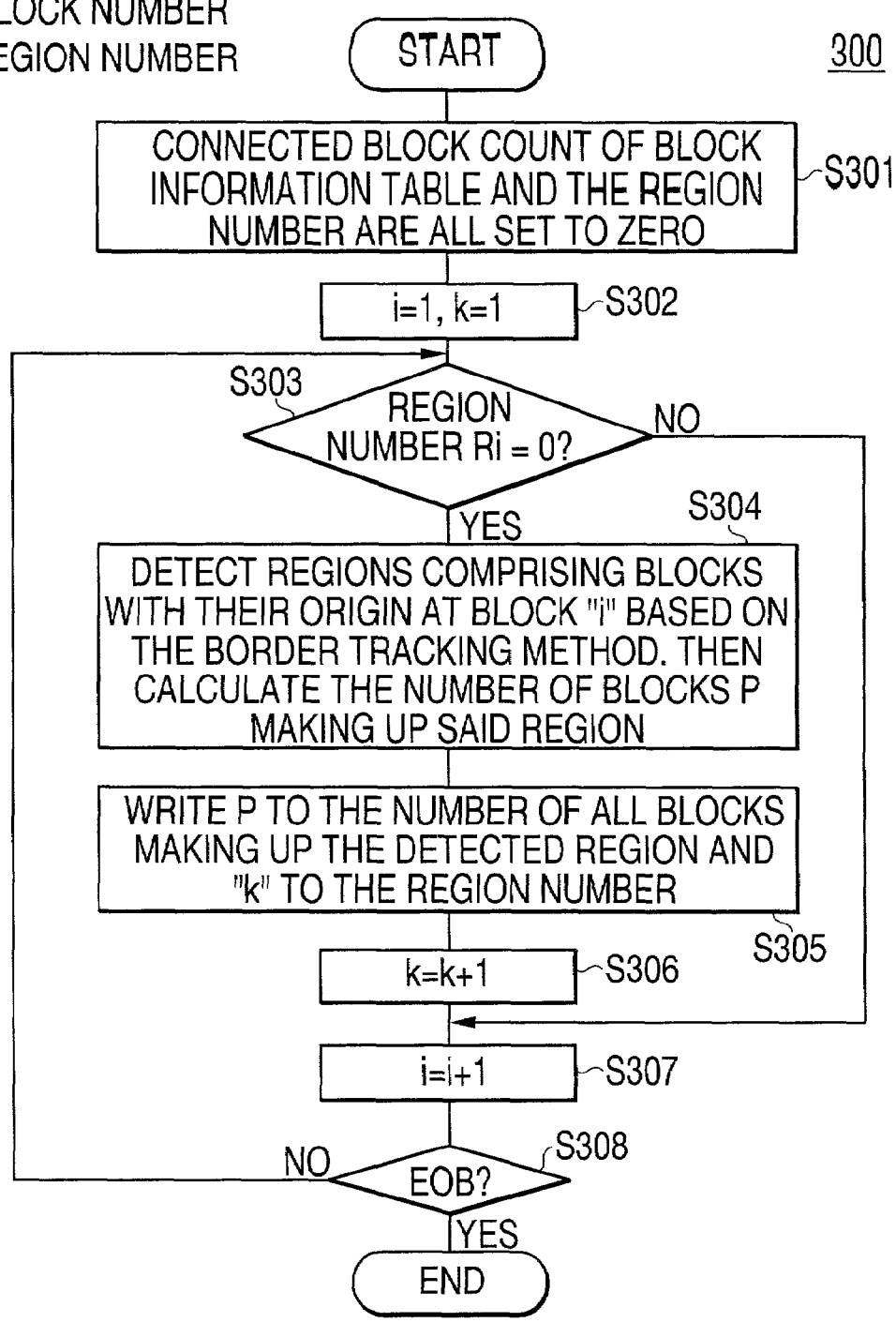
FIG. 6 is a flowchart showing a process for detecting a region comprising neighboring blocks.

FIG. 6 is a process flow chart 300 in which the region comprising contiguous blocks detected in S101 of FIG. 3 is detected.

In the process flow chart 300, "i" indicates the variable for showing the block number in the block information table, and "k" is the variable showing the number of the detected region.

First, for the initial settings, the contiguous block number and the region numbers from the very beginning to the EOB in the block information table 110 (FIG. 4) and 210 (FIG. 8) are all cleared to 0 (S301).

In S302, the block number "i" is set to 1 to show the beginning of the block information table. The region number "k" is also set to 1, to the value indicating the first region.

In S303, the process checks to see whether or not the table region number Ri of block "i" is 0. That is, it checks to see whether the "i" block already belongs to some region. If the table region number is 0, the process judges that the block "i" does not belong to a region and proceeds to S304. If the table region number is not 0, then it is judged to belong to a region and the process goes on to S307.

In S304, the region that is comprising blocks having the block "i" as the starting point is detected, by using "border tracking" method for example. Then a number of blocks "P" making up the detected region in question is calculated. Note that border tracking methods are generally known and have been described, for example, in "Image Processing" (Ozaki et al, Kyoritsu Publishing, 1993, pp. 187·188) and "Image Processing Engineering" (Edited by Taniguchi, Kyoritsu Publishing, 1996, pp. 116~118).

In S305, the block information table is referenced, and the number of all blocks Ci contained in the region detected in S301 is set to P, while the region number Ri is set to "k."

In S306, "1" is added to the region number "k."

In S307, "1" is added to "i" in order to reference the next block information table category.

In S308, the process checks to see whether the block number column of the "i" block information table is EOB or not. That is, it checks to see if the process of all of the blocks detected in S101 has been completed. If the block number is not EOB, the process returns to S303, but if the block number is EOB, then it means that all processes are completed, and the process ends.

By repeating the process from S303 through S308, the regions comprising contiguous blocks will be detected separately from the two-dimensional code, as was the case with regions 1~4 in FIG. 7. The number of contiguous blocks and the region number for each block is calculated as in the block information table 210 shown in FIG. 8. For example, in block 6, the number of connecting blocks belongs to 20 regions and the region number is 3, as shown in FIG. 8.

Figure 9:
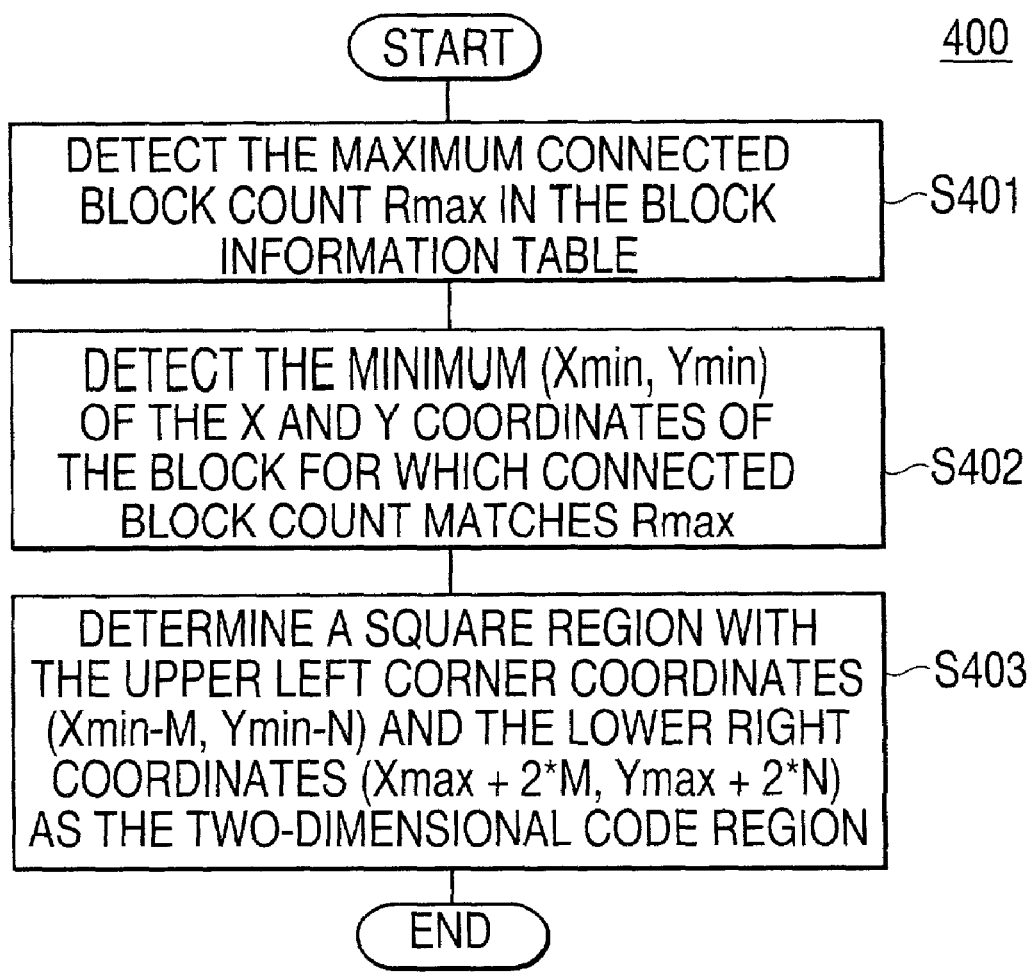
FIG. 9 is a flowchart showing a process for detecting a two-dimensional code region.

FIG. 9 is a process flow diagram 400 showing the first embodiment of the process for detecting two-dimensional code regions of the present invention. The process flow diagram shown in FIG. 9 corresponds to the S103 process shown in FIG. 3.

In S401, the block information table 210 is referenced. The maximum number of contiguous blocks is set to Rmax. In the block information table 210 shown in FIG. 8, Rmax is 20.

In S402, the maximum values (Xmax and Ymax) and the minimum values (Xmin and Ymin) for the X coordinates and Y coordinates are calculated in the block where the contiguous block number matches Rmax. In FIG. 8, the coordinates of block 6 (X6, Y6) or (192, 352) are detected as the minimum values of the coordinates (Xmin and Ymin), while the coordinates of block 26 (X26, Y26) or (352, 448) are detected as the maximum values of the coordinates (Xmax and Ymax).

In S403, the square region having the coordinates of the upper left corner (Xmin−M, Ymin−N) and the coordinates of the lower right corner (Xmax+2×M, Ymax+2×N) is detected as the two-dimensional code region. In the example found in FIG. 7, square region C (shown in FIG. 10), which is separated by a distance of one block from Region 3 of FIG. 7 (or area A of FIG. 10) is detected as a two-dimensional code region.

Figure 10:
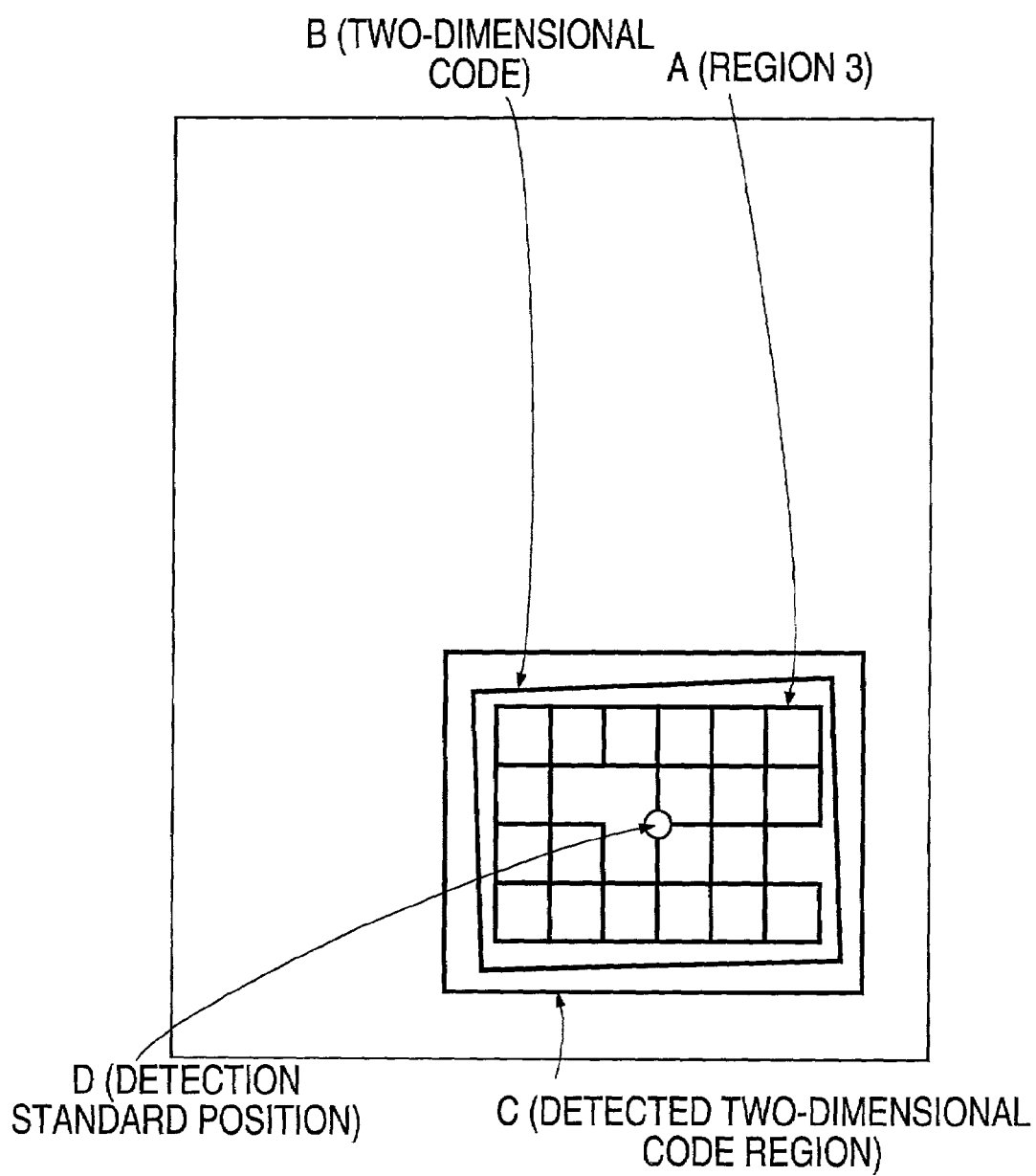
FIG. 10 is a diagram showing an example of a detected two-dimensional code region.

With this method, a region slightly larger than the two-dimensional code area B of FIG. 10, which is the actual two-dimensional code, is detected.

FIG. 11 is a process flow diagram 500 showing the second embodiment of the process of the present invention for detecting two-dimensional code regions. The process flow diagram 500 corresponds to the process S103 in FIG. 3.

In S501, the block information table 210 is referenced and the maximum value of the contiguous block detected is set as Rmax. In FIG. 8, Rmax is 20.

In S502, the center of the region in which the contiguous block number is Rmax is set as the standard position for the detection of the two-dimensional code region. In FIG. 8, region 3 of FIG. 7 (or region A of FIG. 10) is selected as the region having the maximum contiguous block count, and a circle shown in FIG. 12 is selected as the center of the detected region. Here, the center position shown in FIG. 12 may be the center of the square region bordering on region 3 of FIG. 12.

Figure 12A:
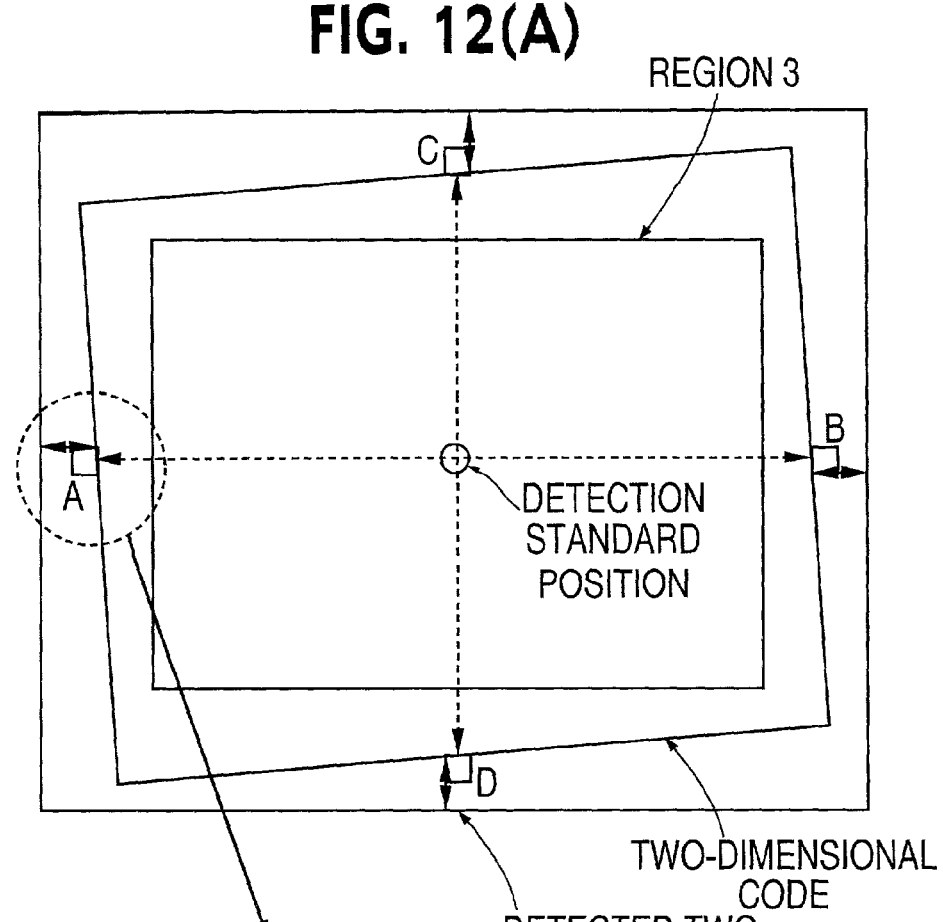
FIG. 12(A) is an enlarged diagram of the two-dimensional code region shown in FIG. 10.
Figure 12B:
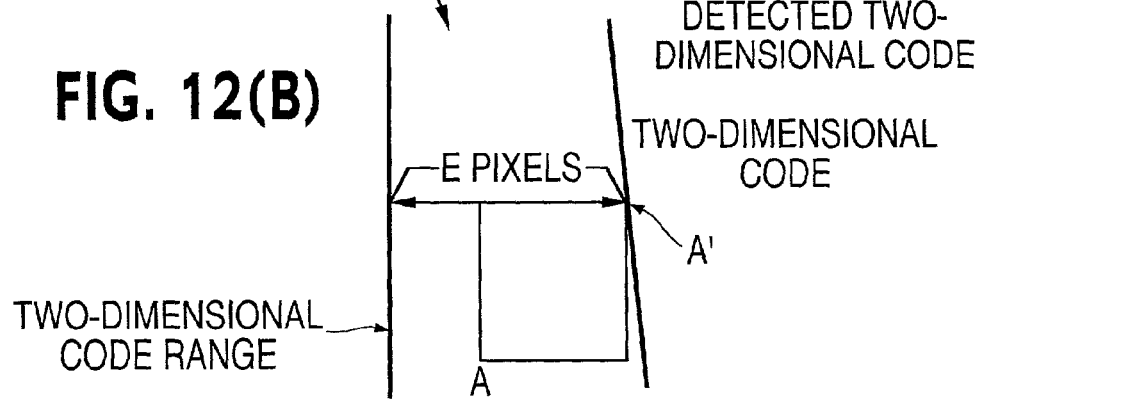
FIG. 12(B) is a diagram of a detected area of FIG. 12(A).

In S503, from the detection standard position determined in S502, square blocks are scanned in upward, downward, to the left and to the right, and a position that a number of black pixels within the block is equal to or less than Q is detected. Q may be equal to 0, but it could also be set to a quantity that takes the effect of noise and other factors into consideration. FIG. 12(A) is an enlarged diagram of region 3 shown in FIG. 10. In FIG. 12(A), an example that the left side position A, the right side position B, the top position C and the bottom position D are detected is shown. In this case, Q is set to 0, and if there is no noise in an input image, the area around A that is detected will resemble as shown in FIG. 12(B). The position A', that is closer to the block standard position, may be set as the position to be detected in S503.

In S504, the square area is set as the two-dimensional code region, by determining the positions that are separated from the four points (top, bottom, right and left) detected in S503 by a specific number of pixels in the direction opposite to the detection standard position. In FIG. 12(A), the detected two-dimensional code region is the square (the outermost square) that passes through positions in which are separated from each of the detection positions A~D by E pixels.

In the first and second embodiments of the present invention, where the two-dimensional code regions are detected above, even if the two-dimensional code is at an angle, the region containing the entire two-dimensional code can still be detected. Not only that, the inclination of the detected two-dimensional code can also be detected and corrected so that the two-dimensional code can be restored to its original state correctly.

Figure 13:
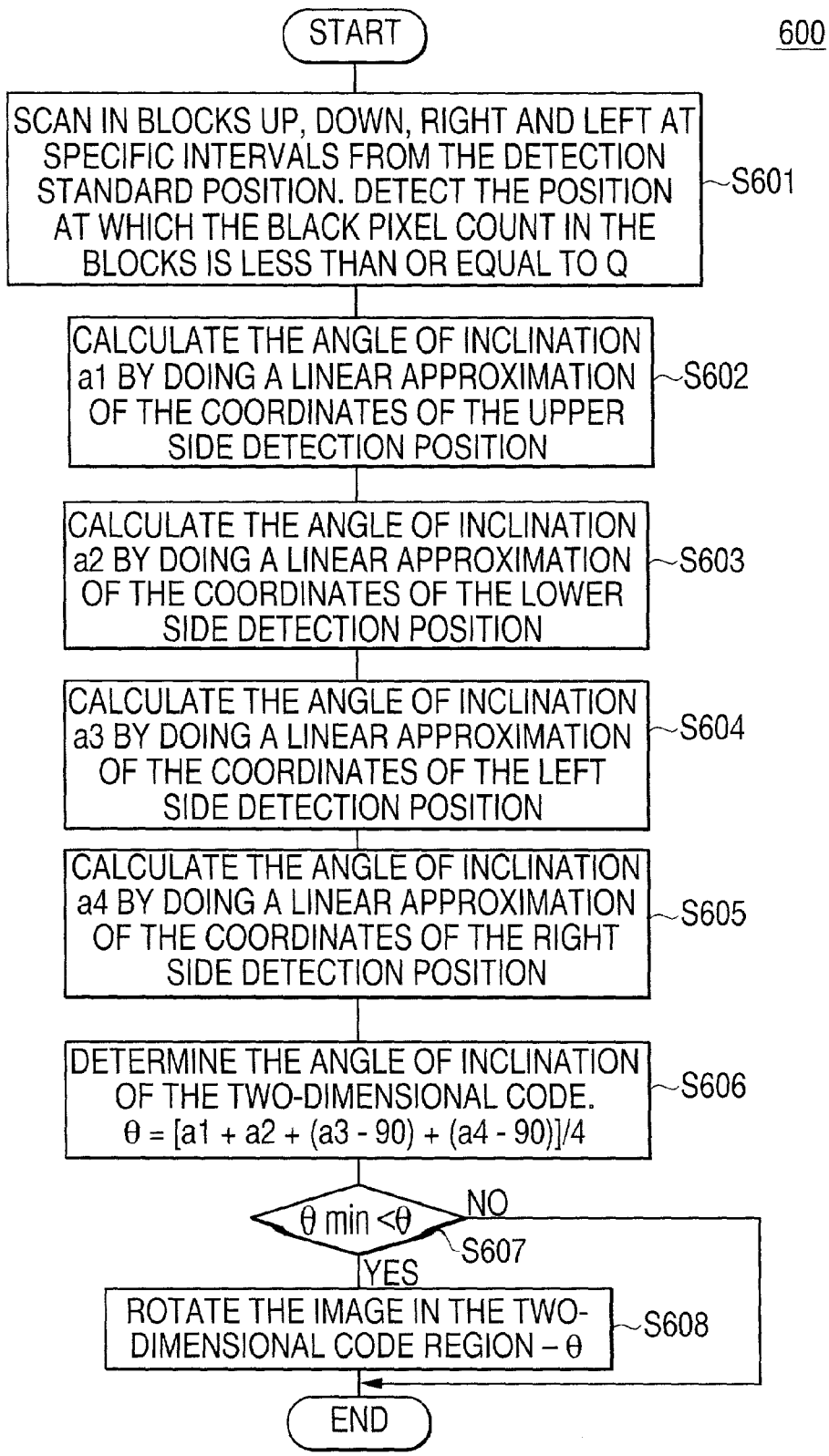
FIG. 13 is a flowchart showing a process for detecting an inclination of a two-dimensional code and for correcting detected inclination.

FIG. 13 shows a process flow diagram 600 of the two-dimensional code inclination correction. The process flow diagram 600 corresponds to the process S105 in FIG. 3.

In S601, scanning of the input image takes place block by block at specific intervals upward, downward to the right and left starting from the detection standard position in the two-dimensional code region. Then, the position within the block where the number of black pixels is less than Q is detected. Here, the detection method is the same as that in S503. The process in S601 detects the positions of each side of the two-dimensional code along the borderline.

In the example of the two-dimensional code region (shown as inclined square region in FIG. 12(A)), the positions A1~A7 are detected along the upper side borderline of the two-dimensional code region. Similarly, the positions B1~B7 are detected along the bottom side borderline of the two-dimensional code region, the positions C~C5 are detected along the left borderline and the positions D1~D5 are detected along the right borderline, as in FIG. 14.

In S602~S605, a linear approximation process is done on the detected positions on the upper, lower, left and right sides. The inclination angle of a1~a4 is calculated. In the example in FIG. 14, the inclination a1 of the approximated line A passes through A1-A7 is calculated. The angle of inclination is also calculated for the lower, left and right sides in the same way.

In S606, the average inclination of a1~a4 is calculated by using the fact that the incident angles of the right and left sides are at right angles to the incident angles of the upper and lower sides. Then the incident angle θ of the two-dimensional code is determined by using the following equation.

$$\theta = (a1 + a2 + (a3 - 90) + (a4 - 90))/4$$

In S607, θ is compared with a specific value θ min. If θ is larger than θ min, the inclination will be corrected in S608 and the process will end. If θ is less than or equal to θ min, the process will end without correcting the inclination. This allows the processing time to be reduced by not performing the rotation processing when the inclination angle is small and there is no need to correct the inclination.

There is a publicly disclosed example of a method for the automatic correction of read-in images to a front view in "Image State Detection Devices and Document Image Correction Devices that Use Them" (Japanese Unexamined Patent Publication, H11-316798).

By running this correction process and correcting the input image to a proper front view before performing process S101 in FIG. 3, the process beginning in will be performed on an image that has been corrected to a front view. This means that the rotation and mirror image reversing will already have been corrected when the two-dimensional code is extracted.

FIG. 15 is a diagram describing other methods for detecting blocks comprising two-dimensional code. FIG. 15 is a diagram that explains how the distance between the black pixels and the observed pixels in the 8×8 pixel-block is calculated. Here, each of the pixels is labeled as followings. The pixel shown at the upper left is "X1, 1", the pixel to the right of "X1, 1" is "X2, 1", the pixel below "X1, 1" is "X1, 2" and so on.

First, looking at the black pixel "X4, 4" in FIG. 5. If the closest black pixels to "X4, 4" in the four directions up, down, right and left are "X4, 3", "X4, 8", "X1, 4" and "X6, 4", then the distance "D4, 4" related to the black pixel "X4, 4" would be calculated using the following equation.

$$D4, 4 = |X4, 4 - X4, 3| + |X4, 4 - X4, 8| + \\ |X4, 4 - X1, 4| + |X4, 4 - X6, 4| \quad (1)$$

Note that if there is no black pixel in one of the four directions of up, down, left and right, or if the viewed pixel is on the outer edge of a block and there is no pixel, then the value for that direction would be 0. For example, if the left side of "X4, 4" is all white pixels (including "X1, 4"), then the distance to the black pixel "X4, 4" would be calculated using the following equation.

$$D4, 4 = |X4, 4 - X4, 3| + |X4, 4 - X4, 8| + |X4, 4 - X6, 4| \quad (2)$$

Generally, the intervals of the black pixels observed can be calculated using the following paragraph.

$$Di, j = |Xi, j - Xi, j - a| + |Xi, j - Xi, j + b| + \\ |Xi, j - Xi - c, j| + |Xi, j - Xi + d, j| \quad (3) \\ = a + b + c + d$$

The first through fourth items of the equation (3), in order to imply the request for the distance between each of the black pixels, up, down, left and right respectively, indicate the distance between the black pixels observed in Xi, J as "a+b +c+d".

If the average distance between the black pixels for all of the black pixels in the block is D and the number of black pixels in the block is N, the following equation can be used for calculation.

$$D = (\Sigma\Sigma Di, j)/N \quad (4)$$

Where for the first Σ means adding Di, j from i=1 through N, and the second Σ means adding Di, j from j=1 through N.

FIG. 16(A) is an example of the black pixel distribution for a text block and FIG. 16(B) is an example of the black pixel distribution for a two-dimensional code block. Generally, in text blocks, the black pixels appear in individualized clusters while in two-dimensional code blocks the black pixels are comparatively scattered.

FIG. 17 (A) is an example of the aforementioned distance between pixels calculated for the text block shown in FIG. 16(A) and FIG. 16(B) is an example of the aforementioned distance between pixels calculated for the two-dimensional code block shown in FIG. 16(B). The small squares drawn with a heavy line indicate black pixels and the numbers in the squares are the values between pixels for the black pixel using equation (1).

In the example in FIG. 16(A), the distance between black pixels in text block totaled 63 and the number of black pixels in the block totaled 24, so the average black pixel distance D would be 2.6 (63/24). On the other hand, in the two-dimensional code block shown in FIG. 16(B), the total distance between black pixels was 131 and the number of black pixels in the block totaled 27, making the average black pixel distance D would be 4.9 (131/27). The average distance between black pixels in the two-dimensional code block is higher than that of the text block.

As is clear from equation (3), the average distance between black pixels D will increase as the space between each pair of black pixel increases. As shown in FIG. 16(A), compared with the text block shown in FIG. 16(B), the black pixels in the two-dimensional code block shown in FIG. 16(A) are more scattered. So the space between black pixels is larger than that of the text block. For this reason, the average distance D between black pixels in the two-dimensional code block will be larger than that of the text block. This difference in distance between black pixels is used to distinguish sections of text from sections of two-dimensional code in blocks.

The Dth value that distinguishes a text block from a two-dimensional code block is determined in the following way. First, several text images containing only text are cut into blocks. The average black pixel distance D1 is calculated for all of the blocks. Next, several two-dimensional code images are cut into blocks and, in the same way as for the text, the average black pixel distance D2 is calculated for all of the blocks. Calculated in this way, it is conceivable that on average, D1 and D2 would show the average distance between black pixels for the text and two-dimensional code blocks respectively. For this reason, the mid-point between D1 and D2 is taken as the Dth value.

It then becomes possible to distinguish blocks with an average distance between black pixels below the Dth value as text blocks, and those with an average distance between black pixels at or above the Dth value as two-dimensional code blocks. As described above, the two-dimensional code extraction methods of the present invention make it possible to automatically extract just the two-dimensional code from image data containing two-dimensional code, text and diagrams. For this reason, paper documents that have two-dimensional code printed alongside text or diagrams can be read in with two-dimensional code by an image scanner and the two-dimensional code can be automatically extracted from the image that was read-in. This makes it possible to restore original data accurately and contributes much to the improvement of the ease with which two-dimensional code can be read in.

The above-mentioned methods can be encoded and implemented in a computer software program stored on a computer-readable medium and executed by a computer. When executed by a computer, the computer software program causes the computer to execute the above-mentioned methods of the present invention.

Figure 18:
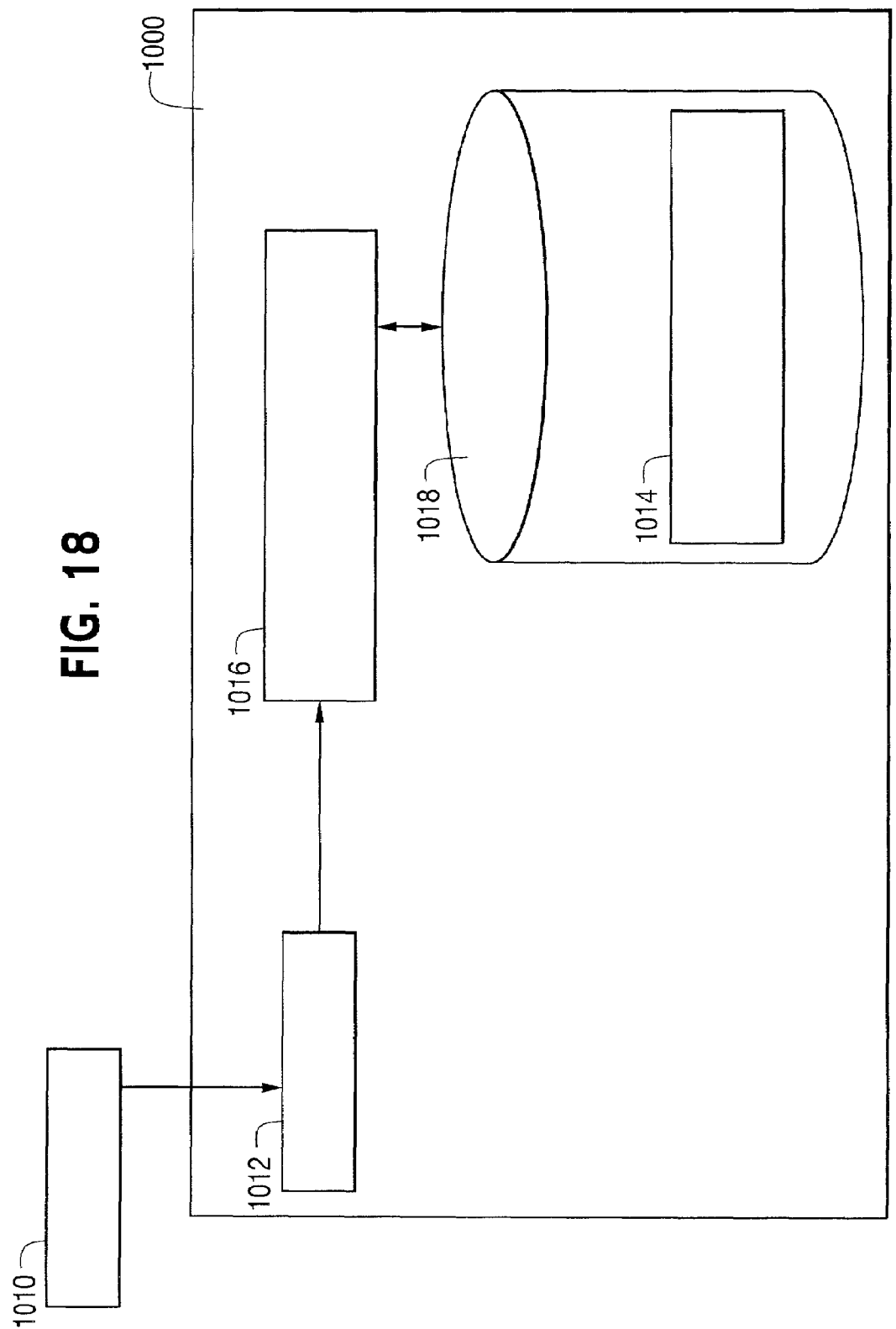
FIG. 18 is a diagram of a computer system and computer-readable medium implementing the present invention.

FIG. 18 shows one of the examples of a device that operates the above-mentioned methods. In FIG. 18, 1000 is a computer system, such as a personal computer, comprising image scanner unit 1012, a CPU 1016 and a computer-readable medium 1018. The computer-readable medium can be a magnetic disc, semiconductor memory unit, or any other recording medium. The storage unit 1018 stores the computer software 1014 as mentioned above.

Two-dimensional code is recorded on a document 1010, and an operator scans the document 1010 by the image scanner unit 1012. The image data scanned by the image scanner unit 1012 is then sent to the CPU 1016. The CPU 1016 reads the computer software 1014 from the computer-readable medium 1018, and operates the two-dimensional code extracting method as described above. The CPU 1016 also decodes the extracted two-dimensional code.

The image scanner unit 1012 shown in FIG. 18 can be an external image scanner 1012 that is connected to a computer/CPU 1016. The computer/CPU 1016 operates the two-dimensional code extracting process. On the other hand, an image scanner itself may contain a CPU and software for extracting two-dimensional code. In this case, the image scanner extracts two-dimensional code from the scanned image data, and, additionally, may decode the extracted two-dimensional code. The decoded data may be sent to an external device such as personal computer, or processed by the image scanner. However, the image scanner may merely extracts two-dimensional code data, and output extracted two-dimensional code data to an external device for decoding process.

Although the above-mentioned embodiments of the present invention have been shown and described, it would be appreciated by those skilled in the art that changes may be made in these embodiments without departing from the principles and spirit of the invention, the scope of which is defined in the claims and their equivalents.

What we claim is:

1. A two-dimensional code extraction method comprising:
    inputting image data;
    scanning said input image data in a square block unit of MXN pixels (M and N are positive integers);
    detecting blocks that satisfy specific conditions from scanned blocks;
    detecting a plurality of regions of blocks corresponding to a respective plurality of two-dimensional codes, each region of blocks comprising a number of neighboring and contiguous blocks from among said detected blocks that satisfy specific conditions from said scanned blocks;
    detecting one or more areas enclosing respective two-dimensional codes, each a two-dimensional code area enclosing by a margin a corresponding detected region of blocks comprising the predetermined number of the neighboring and contiguous blocks as the two-dimensional code; and
    extracting one or more two dimensional codes from among the detected one or more two-dimensional code areas that have more than a predetermined number of the neighboring and contiguous blocks.

2. The two-dimensional code extraction method according to claim 1, wherein a block that includes a ratio of white pixels and black pixels that falls within a specific range is detected as a block satisfying said specific conditions.

3. The two-dimensional code extraction method according to claim 1, wherein a block that includes a ratio between transition points of pixels within horizontal lines or vertical lines of the block and a total number of pixels of the block that falls within a specific range is detected as a block satisfying said specific conditions.

4. The two-dimensional code extraction method according to claim 1, wherein a block in which variation of a vertical or horizontal projection of black pixels included in each line in the block falls within a specific range is detected as a block satisfying said specific conditions.

5. The two-dimensional code extraction method according to claim 1, further comprising:
    from among the detected one or more regions of two dimensional codes, detecting a two-dimensional code region enclosing by the margin a corresponding detected region of blocks comprising a maximum number of detected neighboring and contiguous blocks as the two dimensional code.

6. The two-dimensional code extraction method according to claim 1, wherein the two-dimensional code area margin is determined by:
    scanning an area of the detected region of blocks, from a point within said region of blocks, block by block having a predetermined size upward, downward, to the right and to the left of said point;
    detecting a position such that a number of black pixels within said scanned area is less than a predetermined value; and
    extracting a square area including said detected position as the two-dimensional code area that encloses by the margin the corresponding detected region of blocks, for each of the plurality of detected regions of blocks.

7. A two-dimensional code extraction method according to claim 1, further comprising:
    calculating average distance between pairs of black pixels within said scanned blocks; and
    extracting a scanned block as a detected block satisfying said specific conditions, when a determination is made that said calculated average distance exceeds a predetermined value.

8. The two-dimensional code extraction method according to claim 1, further comprising:
    determining an angle of inclination of the input image or the angle of inclination of a two-dimensional code based upon a two-dimensional code area enclosing the detected region of blocks comprising the predetermined number of the neighboring and contiguous blocks as the two-dimensional code; and
    correcting the angle of inclination, if the angle of inclination exceeds a specific value.

9. The two-dimensional code extraction method according to claim 1, further comprising:
    from among the detected one or more two dimensional code areas, detecting a two-dimensional code area enclosing by the margin a corresponding detected region of blocks comprising a maximum number of detected contiguous blocks as the two-dimensional code.

10. A computer-readable medium storing a program which, when executed by a computer, causes the computer to execute a two-dimensional code extraction method comprising:
    inputting image data;
    scanning said input image data in a square block unit of MxN pixels (M and N are positive integers);
    detecting blocks that satisfy specific conditions from scanned blocks;
    detecting a plurality of regions of blocks corresponding to a respective plurality of two-dimensional codes, each region of blocks comprising a number of neighboring and contiguous blocks from among said detected blocks that satisfy specific conditions from said scanned blocks;

detecting one or more areas enclosing respective two-dimensional codes, each two-dimensional code area enclosing by a margin a corresponding detected region of blocks comprising the predetermined number of the neighboring and contiguous blocks as the two-dimensional code; and extracting one or more two-dimensional codes from among the detected one or more two-dimensional code areas that have more than a predetermined number of neighboring and contiguous blocks.

11. The computer-readable medium according to claim 10, wherein a block that includes a ratio of white pixels and black pixels that falls within a specific range is detected as a block satisfying said specific conditions.

12. The computer-readable medium according to claim 10, wherein a block that includes a ratio between transition points of pixels within horizontal lines or vertical lines of the block and a total number of pixels of the block that falls within a specific range is detected as a block satisfying said specific conditions.

13. The computer-readable medium according to claim 10, wherein a block in which variation of a vertical or horizontal projection of black pixels included in each line in the block falls within a specific range is detected a block satisfying said specific conditions.

14. The computer-readable medium according to claim 10, further comprising:

from among the detected one or more two dimensional code areas, detecting a two-dimensional code area enclosing by the margin a corresponding detected region of blocks comprising a maximum number of detected neighboring and contiguous blocks as the two dimensional code.

15. The computer-readable medium according to claim 10, wherein the two-dimensional code area margin is determined by:

scanning an area of the detected region of blocks, from a point within said region of blocks, block by block having a predetermined size upward, downward, to the right and to the left of said point;

detecting a position such that a number of black pixels within said scanned area is less that a predetermined value; and extracting a square area including said detected position as the two-dimensional code area that encloses by the margin the corresponding detected region of blocks, for each of the plurality of detected regions of blocks.

16. The computer-readable medium according to claim 10, further comprising:

calculating average distance between pairs of black pixels within said scanned blocks; and extracting a scanned block as a detected block satisfying said specific conditions, when a determination is made that said calculated average distance exceeds a predetermined value.

17. The computer-readable medium according to claim 10, further comprising:

determining an angle of inclination of the input image or the angle of inclination of a two-dimensional code based upon a two-dimensional code area enclosing the detected region of blocks comprising the predetermined number of the neighboring and contiguous blocks as the two-dimensional code; and correcting the angle of inclination, if the angle of inclination exceeds a specific value.

18. The computer-readable medium according to claim 10, further comprising:

from among the detected one or more two dimensional code areas, detecting a two-dimensional code area enclosing by the margin a corresponding detected region of blocks comprising a maximum number of detected contiguous blocks as the two-dimensional code.

19. An apparatus extracting two-dimensional code from an input document, comprising:

an image scanner scanning the document, and outputting input image data; and a programmed computer processor connected to said image scanner and controlling the apparatus according to a two-dimensional code extraction process, comprising:

scanning said input image data in a square block unit of MxN pixels (M and N are positive integers), detecting blocks that satisfy specific conditions from scanned blocks, detecting a plurality of regions of blocks corresponding to a respective plurality of two-dimensional codes, each region of blocks comprising a number of neighboring and contiguous blocks from among said detected blocks that satisfy specific conditions from said scanned blocks, detecting one or more areas enclosing respective two-dimensional codes, each two-dimensional code area enclosing by a margin a corresponding detected region of blocks comprising the predetermined number of the neighboring and contiguous blocks as the two-dimensional code, and extracting one or more two-dimensional codes from among the detected one or more two-dimensional code areas that have more than a predetermined number of the neighboring and contiguous blocks.

20. The apparatus extracting two-dimensional code according to claim 19, further comprising means for reading information from a computer-readable medium containing computer software for said two-dimensional code extraction process.

* * * * *

UNITED STATES PATENT AND TRADEMARK OFFICE
CERTIFICATE OF CORRECTION

PATENT NO. : 7,350,710 B2 Page 1 of 1
APPLICATION NO. : 09/835625
DATED : April 1, 2008
INVENTOR(S) : Kenichiro Sakai et al.

It is certified that error appears in the above-identified patent and that said Letters Patent is hereby corrected as shown below:

Column 13, Line 49, after "each" delete "a".

Signed and Sealed this

Twenty-sixth Day of August, 2008

JON W. DUDAS
*Director of the United States Patent and Trademark Office*